(12) United States Patent
Toyama et al.

(10) Patent No.: US 10,434,612 B2
(45) Date of Patent: Oct. 8, 2019

(54) MACHINE TOOL

(71) Applicant: JTEKT CORPORATION, Osaka-shi (JP)

(72) Inventors: Koji Toyama, Hekinan (JP); Yoshio Ootsuka, Ichinomiya (JP); Yuki Konno, Kariya (JP)

(73) Assignee: Jtekt Corporation, Osaka-shi (JP)

( * ) Notice: Subject to any disclaimer, the term of this patent is extended or adjusted under 35 U.S.C. 154(b) by 97 days.

(21) Appl. No.: 15/852,077

(22) Filed: Dec. 22, 2017

(65) Prior Publication Data
US 2018/0178301 A1 Jun. 28, 2018

(30) Foreign Application Priority Data

Dec. 27, 2016 (JP) .................................. 2016-254448

(51) Int. Cl.
*B23Q 3/157* (2006.01)
*B23Q 11/08* (2006.01)
(Continued)

(52) U.S. Cl.
CPC .......... *B23Q 11/08* (2013.01); *B23Q 3/15713* (2013.01); *B23Q 3/15722* (2016.11);
(Continued)

(58) Field of Classification Search
CPC . Y10T 483/115; B23Q 3/155–3/15793; B23Q 11/08–11/0891; G05B 2219/40062; G05B 2219/45242
(Continued)

(56) References Cited

U.S. PATENT DOCUMENTS 5,224,916 A * 7/1993 Chang .................... B23Q 11/08
483/3
5,669,751 A * 9/1997 Hoffman .................. B23Q 7/04
198/950
(Continued)

FOREIGN PATENT DOCUMENTS

JP          62-039153 A  *  2/1987
JP          02-053331 U  *  4/1990
(Continued)

OTHER PUBLICATIONS

Machine Translation of JP 2003-089028-A, which JP '028 was published Mar. 2003.*
(Continued)

*Primary Examiner* — Erica E Cadugan
(74) *Attorney, Agent, or Firm* — Oblon, McClelland, Maier & Neustadt, L.L.P.

(57) ABSTRACT

A machine tool includes a bed, a column, a rotary main spindle, a tool magazine, a tool changer, and a controller. The tool changer includes a body provided on the bed so as to be movable in a direction orthogonal to a movement direction of the column, a changing arm rotatably provided on the body, and a door provided on the body to open or close an opening formed in the body, and configured to partition an area on the column side from an area on the tool magazine side by closing the opening. The controller is configured to move the body in parallel with at least one of an operation of opening the door and an operation of closing the door.

10 Claims, 6 Drawing Sheets

(51) Int. Cl.
*B23F 1/06* (2006.01)
*B23Q 3/155* (2006.01)

(52) U.S. Cl.
CPC ..... *B23Q 3/15766* (2013.01); *B23Q 3/15773* (2013.01); *B23Q 11/0841* (2013.01); *B23F 1/06* (2013.01); *B23Q 2003/155407* (2016.11); *B23Q 2003/155428* (2016.11); *B23Q 2003/155446* (2016.11); *G05B 2219/40062* (2013.01); *G05B 2219/45242* (2013.01); *Y10T 483/115* (2015.01)

(58) Field of Classification Search
USPC ............................................................ 483/3
See application file for complete search history.

(56) References Cited

U.S. PATENT DOCUMENTS

| | | | | |
|---|---|---|---|---|
| 7,229,395 | B2* | 6/2007 | Yoshida | B23Q 11/0891 483/3 |
| 8,114,000 | B2* | 2/2012 | Yasuda | B23Q 3/15766 29/27 C |
| 2003/0050159 | A1* | 3/2003 | Kato | B23Q 3/1554 483/3 |
| 2016/0193706 | A1* | 7/2016 | Kanda | B23Q 3/1554 483/58 |
| 2017/0308063 | A1* | 10/2017 | Kawai | B23Q 15/00 |
| 2018/0015585 | A1* | 1/2018 | Kasahara | B23Q 3/155 |
| 2018/0032052 | A1* | 2/2018 | Ishii | B23Q 3/157 |
| 2018/0215001 | A1* | 8/2018 | Kasahara | B23Q 3/155 |
| 2018/0222002 | A1* | 8/2018 | Kasahara | B23Q 3/15513 |
| 2018/0250784 | A1* | 9/2018 | Kasahara | B23Q 3/15546 |
| 2019/0001453 | A1* | 1/2019 | Ishikawa | B23Q 11/0883 |

FOREIGN PATENT DOCUMENTS

| | | | |
|---|---|---|---|
| JP | 02-106247 A | * | 4/1990 |
| JP | 04-129636 A | * | 4/1992 |
| JP | 08-099247 A | * | 4/1996 |
| JP | 09-076138 A | * | 3/1997 |
| JP | 2003-89028 | | 3/2003 |
| JP | 2005-186180 A | * | 7/2005 |
| JP | 2008-194786 A | * | 8/2008 |
| JP | 2009-006455 A | * | 1/2009 |
| JP | 2010-228063 A | * | 10/2010 |
| JP | 2013-063488 A | * | 4/2013 |

OTHER PUBLICATIONS

Machine Translation of JP 08-099247-A, which JP '247 was published Apr. 1996.*

* cited by examiner

MACHINE TOOL

INCORPORATION BY REFERENCE

The disclosure of Japanese Patent Application No. 2016-254448 filed on Dec. 27, 2016 including the specification, drawings and abstract, is incorporated herein by reference in its entirety.

BACKGROUND OF THE INVENTION

1. Field of the Invention

The present invention relates to a machine tool.

2. Description of the Related Art

There is known a machine tool including a tool magazine, a rotary main spindle, and a tool changer. The tool magazine is configured to house a plurality of tools. Each of the tools is attached to the rotary main spindle in a detachable manner. The tool changer changes the tool attached to the rotary main spindle for a tool housed in the tool magazine. Japanese Patent Application Publication No. 2003-89028 (JP 2003-89028 A) discloses the following technology. A slide door is provided so as to partition an area where an automatic attaching/detaching device (tool changer) is arranged from an area where a main spindle (rotary main spindle) is arranged. The slide door shuts off chips and coolant to be scattered from the main spindle side toward the automatic attaching/detaching device.

In the technology described in JP 2003-89028 A, the automatic attaching/detaching device starts an operation of changing the tool after the slide door is opened. As a result, a longer period of time is required to change the tool.

SUMMARY OF THE INVENTION

It is one object of the present invention to provide a machine tool in which the period of time required to change a tool can be shortened.

A machine tool according to one aspect of the present invention includes:

- a bed;
- a column provided so as to be reciprocally movable on the bed;
- a rotary main spindle rotatably provided on the column;
- a tool magazine configured to house tools;
- a tool changer configured to change the tool attached to the rotary main spindle for the tool housed in the tool magazine; and
- a controller configured to control the column, the rotary main spindle, and the tool changer.

The tool changer includes a body, a changing arm, and a door. The body is provided on the bed so as to be movable in a direction orthogonal to a movement direction of the column. The changing arm is rotatably provided on the body. The door is provided on the body to open or close an opening formed in the body, and is configured to partition an area on the column side from an area on the tool magazine side by closing the opening.

The controller is configured to move the body in parallel with at least one of an operation of opening the door and an operation of closing the door.

According to the machine tool of the aspect described above, the body is moved in parallel with at least one of the operation of opening the door and the operation of closing the door. Thus, the period of time required to change the tool can be shortened.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention to which a machine tool is applied is described below with reference to the drawings. The description is herein given of an exemplary case where a machine tool 1 is a gear cutting machine configured to form internal teeth on a workpiece W. The present invention is also applicable to other machine tools such as a grinding machine.

Figure 1:
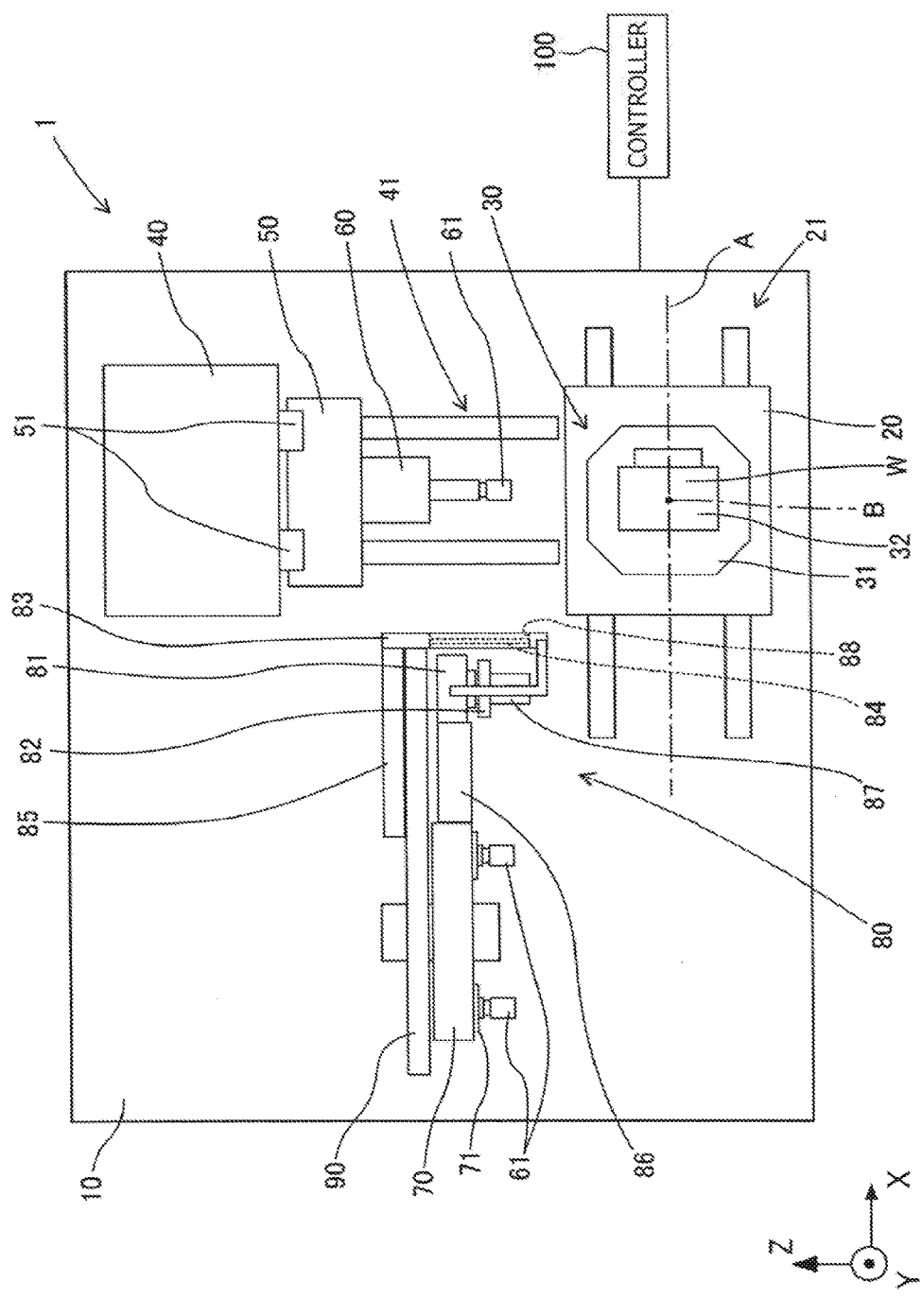
FIG. 1 is a plan view of a machine tool according to one embodiment of the present invention.

As illustrated in FIG. 1, the machine tool 1 mainly includes a bed 10, a table 20, a column 40, a saddle 50, a rotary main spindle 60, a tool magazine 70, a tool changer 80, and a controller 100.

The bed 10 is formed into a substantially rectangular shape. The table 20 is arranged on the bed 10. A pair of X axis guide rails 21 extending in an X axis direction (lateral direction in FIG. 1) are provided on the bed 10. The table 20 is driven by a screw feed mechanism (not illustrated) to reciprocally move in the X axis direction.

The table 20 mainly includes a swiveling table 31 and a rotary table 32. The swiveling table 31 is provided on the table 20 so as to be swivelable about a B axis parallel to a Y axis direction. The rotary table 32 is provided on the swiveling table 31 so as to be rotatable about an A axis (see FIG. 2) orthogonal to the B axis. The workpiece W is held by the rotary table 32 so as to be rotatable together with the rotary table 32. The workpiece W held by the rotary table 32 rotates about the A axis along with the rotation of the rotary table 32.

The column 40 is arranged on the top face of the bed 10. A pair of Z axis guide rails 41 extending in a Z axis direction (vertical direction in FIG. 1) are provided on the bed 10. The column 40 is driven by a screw feed mechanism (not illustrated) to reciprocally move in the Z axis direction. The saddle 50 is arranged on one face of the column 40 that is parallel to a plane orthogonal to the Z axis direction. A pair of Y axis guide rails 51 extending in the Y axis direction (direction perpendicular to the drawing sheet of FIG. 1) are provided on the face of the column 40. The saddle 50 is driven by a screw feed mechanism (not illustrated) to reciprocally move in the Y axis direction.

The rotary main spindle 60 is provided so as to be rotatable by being driven by a spindle motor (not illustrated) housed in the saddle 50. A cutting tool 61 is attached to the tip of the rotary main spindle 60 in a detachable manner. The cutting tool 61 is configured to form internal teeth on the workpiece W. The cutting tool 61 moves in the Z axis direction and in the Y axis direction relative to the bed 10 along with the movement of the column 40 and the saddle 50.

Figure 2:
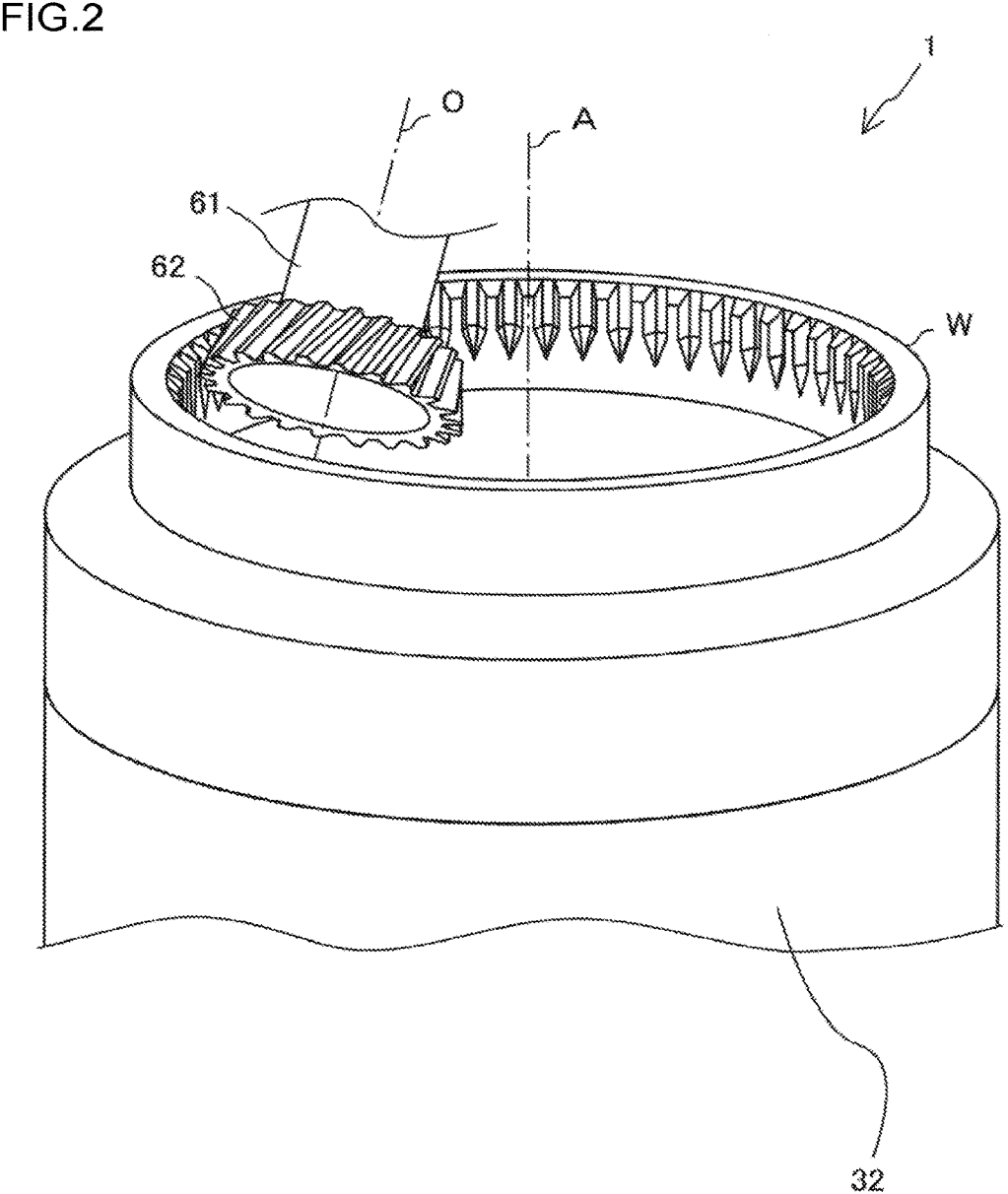
FIG. 2 is a view illustrating an operation of a cutting tool.

As illustrated in FIG. 2, the machine tool 1 forms internal teeth by cutting work while synchronously rotating the cutting tool 61 and the workpiece W and feeding the cutting tool 61 in the rotational axis direction of the workpiece W (A axis direction). The cutting tool 61 rotates about a central axis O through the rotation of the rotary main spindle 60 (see FIG. 1). The cutting tool 61 includes a plurality of cutting teeth 62 having a helix angle with respect to the central axis O. The radially outer face of the cutting tooth 62 has a relief angle with respect to the central axis O of the cutting tool 61. The end face of the cutting tooth 62 has a rake angle with respect to a plane orthogonal to the central axis of the cutting tool 61.

When gear cutting is performed, the machine tool 1 pivots the swiveling table 31 (see FIG. 1) so that the central axis (A axis) of the workpiece W is inclined and twisted with respect to the central axis (O axis) of the cutting tool 61. Then, the machine tool 1 moves the cutting tool 61 in the A axis direction relative to the workpiece W while synchronously rotating the cutting tool 61 and the workpiece W in a state in which the inclination angle of the swiveling table 31 is maintained. At this time, a difference in relative speed is caused between the workpiece W and the cutting tool 61, and therefore the inner peripheral surface of the workpiece W is cut at portions in contact with the cutting teeth 62. Thus, internal teeth are formed on the workpiece W.

The description continues with reference to FIG. 1 again. The tool magazine 70 houses a plurality of cutting tools 61. FIG. 1 only illustrates two cutting tools 61 for simplification of the drawing. A support plate 90 is fixed to the top face of the bed 10. The tool magazine 70 is rotatably provided on the support plate 90.

The tool changer 80 changes the cutting tool 61 attached to the rotary main spindle 60 for the cutting tool 61 housed in the tool magazine 70. The tool changer 80 is arranged between the tool magazine 70 and the column 40 in the X axis direction.

The tool changer 80 mainly includes a body 81, a changing arm 82, a frame 83, a door 84, a moving member 85, and a tool holder 86. The body 81 supports the changing arm 82 so that the changing arm 82 is rotatable about an axis parallel to the Z axis. The changing arm 82 is a substantially S-shaped member formed so that both sides in its longitudinal direction are shaped into hooks configured to grip the cutting tools 61. The changing arm 82 is driven by an arm motor 87 to rotate about the axis parallel to the Z axis.

The frame 83 is arranged between the tool magazine 70 and the column 40 in the X axis direction at a position closer to the column 40 with respect to the support plate 90. An opening 88 is formed in the frame 83 at a position that faces the changing arm 82 in the X axis direction.

The door 84 is provided on the frame 83 to open or close the opening 88. The frame 83 is provided with a spring (not illustrated). The opening 88 is opened by winding up the door 84 with an urging force of the spring. The frame 83 is also provided with an actuator (not illustrated) coupled to the door 84. The door 84 is unwound against the urging force of the spring by driving the actuator. Thus, the opening 88 is closed.

The moving member 85 is provided opposite to the body 81 across the support plate 90. The support plate 90 is provided with a screw feed mechanism (not illustrated) on a surface opposite to the surface where the tool magazine 70 is mounted. The moving member 85 is provided so as to be movable in the X axis direction relative to the support plate 90 by the screw feed mechanism. The moving member 85 is formed integrally with the frame 83, and the body 81 is coupled to the frame 83 via a bracket 89. That is, the body 81 and the frame 83 are provided so as to be movable together in the X axis direction along with the movement of the moving member 85.

The tool holder 86 is provided on the body 81, and moves together with the body 81. The tool holder 86 holds one cutting tool 61 to be used for changing the cutting tool 61 attached to the rotary main spindle 60. The body 81 is provided with an actuator (not illustrated). With the actuator, the cutting tool 61 taken out of the tool magazine 70 is held by the tool holder 86.

The controller 100 controls the column 40, the saddle 50, the rotary main spindle 60, the tool magazine 70, and the tool changer 80. For example, the controller 100 controls the positions of the column 40 and the saddle 50, the rotation of the rotary main spindle 60, and the operations of the tool magazine 70 and the tool changer 80.

Figure 3A:
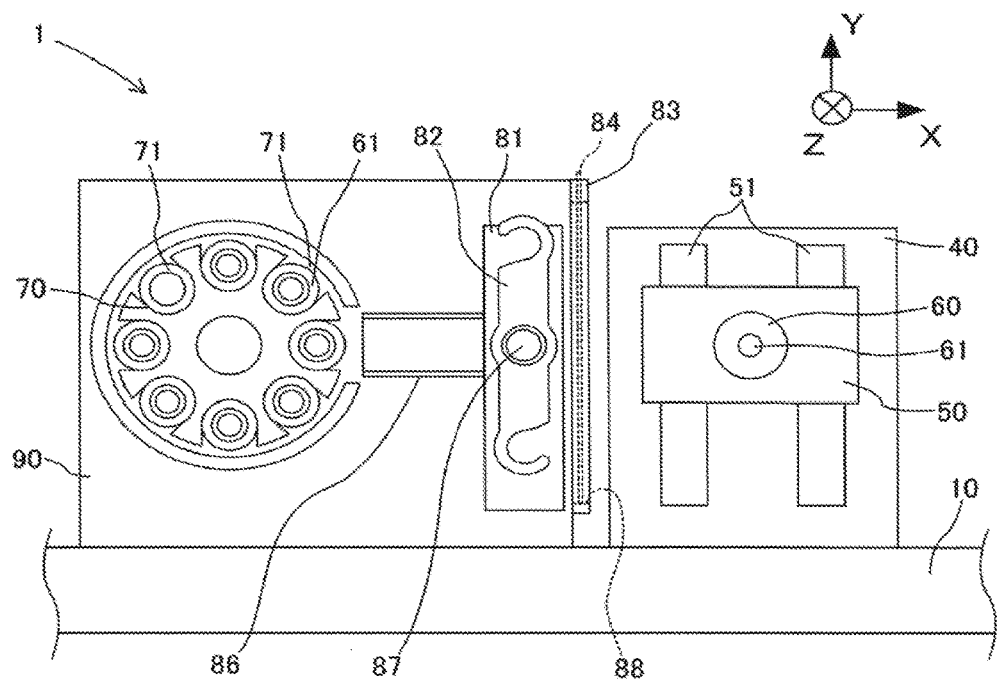
FIG. 3A is a front view of the machine tool.

Next, an operation to be performed by the machine tool 1 when changing the cutting tool 61 is described with reference to FIG. 3A to FIG. 4. As illustrated in FIG. 3A, a plurality of sockets 71 are attached to the tool magazine 70 in a detachable manner. The cutting tools 61 are respectively housed in the sockets 71. In the state illustrated in FIG. 3A, one of the plurality of cutting tools 61 housed in the tool magazine 70 is attached to the rotary main spindle 60, and therefore no cutting tool 61 is housed in one of the plurality of sockets 71 attached to the tool magazine 70.

Before the tool changer 80 starts to change the cutting tool 61, the controller 100 swivels the tool magazine 70 to arrange the cutting tool 61 to be used next at a position that faces the tool holder 86. As viewed in the Z axis direction, the tool changer 80 is arranged at a position where the tool changer 80 does not interfere with the column 40. The changing arm 82 is held in a state in which its longitudinal direction coincides with the Y axis direction. At this time, the entire changing arm 82 is arranged on the tool magazine 70 side with respect to the frame 83, and the opening 88 is closed by the door 84. Therefore, the area on the column 40 side and the area on the tool magazine 70 side are partitioned from each other by the door 84. Thus, chips, coolant, and the like that adhere to the cutting tool 61 attached to the rotary main spindle 60 can be prevented from being scattered toward the tool magazine 70 through the opening 88.

Figure 3B:
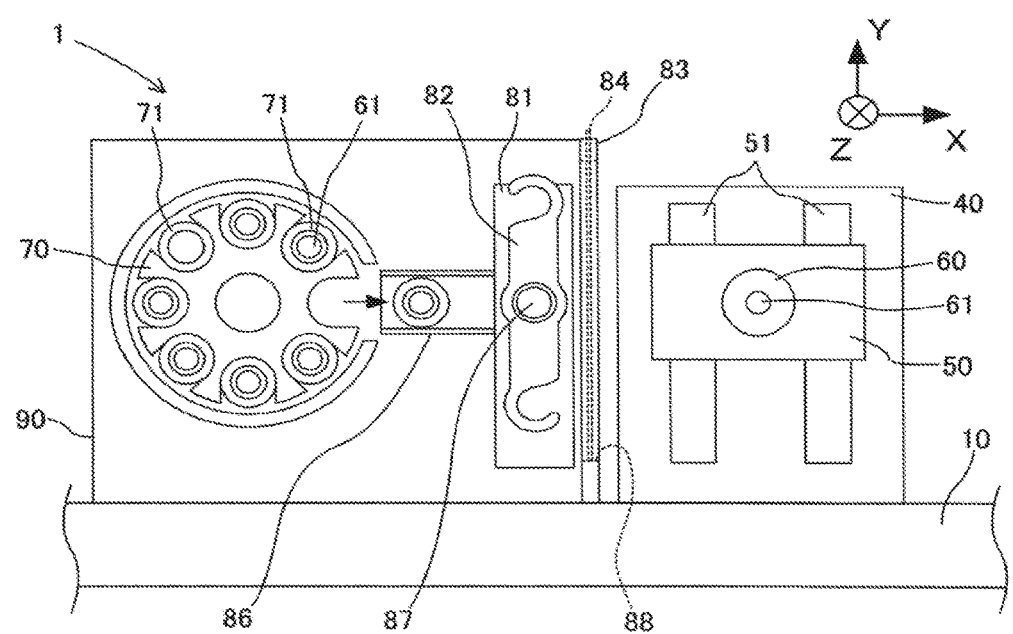
FIG. 3B is a front view of the machine tool, illustrating a state in which one cutting tool housed in a tool magazine is moved to a tool holder.

As illustrated in FIG. 3B, the cutting tool 61 and the socket 71 indexed at the position that faces the tool holder 86 are transferred to the tool holder 86 by the actuator (not illustrated). Thus, the cutting tool 61 transferred to the tool holder 86 is arranged at a position where the cutting tool 61 can be gripped by the changing arm 82.

Figure 4:
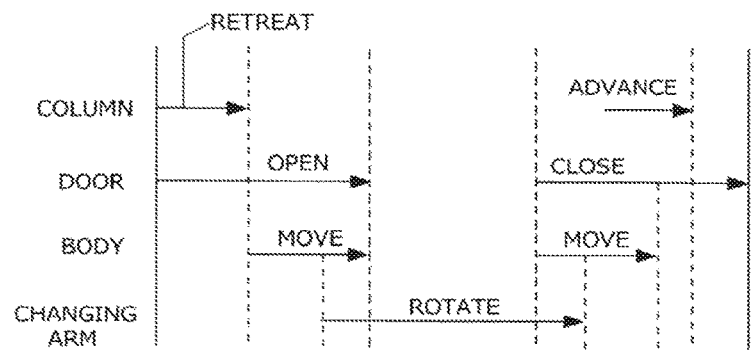
FIG. 4 is a time chart illustrating operation conditions of the column, a door, the body, and the changing arm.

As illustrated in FIG. 4, at the start of the change of the cutting tool 61, the controller 100 first retreats the column 40 away from the table 20 (upward in FIG. 1) in order to arrange the column 40 at a position where the column 40 does not interfere with the tool changer 80. The controller 100 stops the rotation of the rotary main spindle 60, and moves the saddle 50 to arrange the cutting tool 61 attached to the rotary main spindle 60 at a position where the cutting tool 61 can be gripped by the changing arm 82.

Figure 3C:
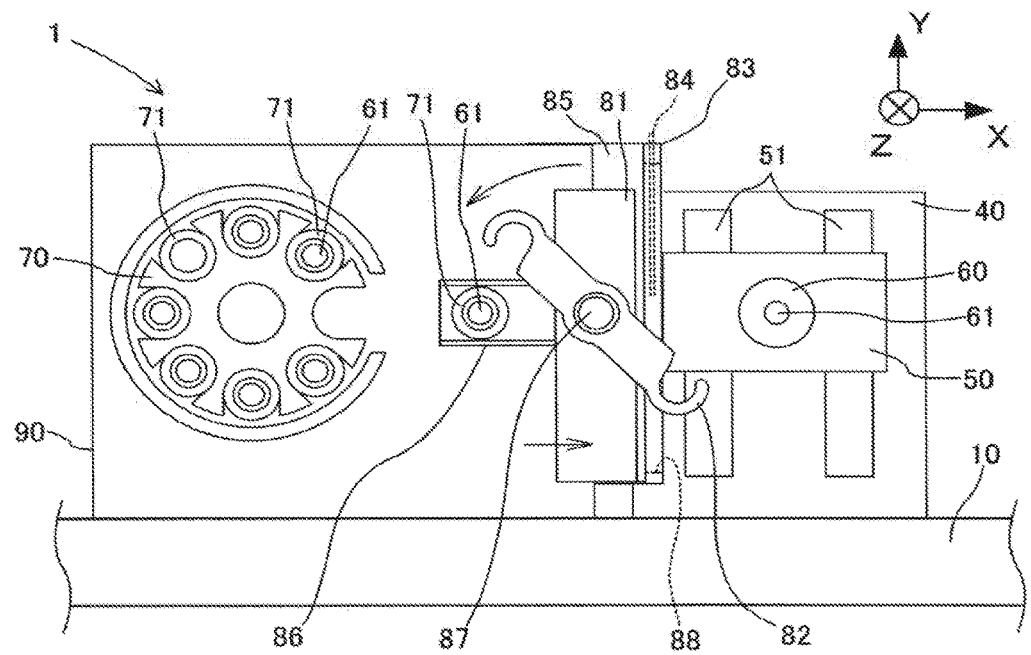
FIG. 3C is a front view of the machine tool, illustrating a state after movement of a body toward a column and rotation of a changing arm are started.

The controller 100 starts an operation of opening the door 84 in parallel with the operation of retreating the column 40. When the column 40 retreats to the position where the column 40 can avoid interfering with the tool changer 80, the controller 100 starts movement of the body 81 toward the column 40 (rightward in FIG. 1). At this time, the controller 100 performs the operation of opening the door 84 and the movement of the body 81 in parallel. As illustrated in FIG. 3C, when the opening 88 is opened through the operation of opening the door 84 to such a degree that the changing arm 82 and the door 84 can avoid interfering with each other, the controller 100 starts rotation of the changing arm 82 in a counterclockwise direction illustrated in FIG. 3C.

Figure 3D:
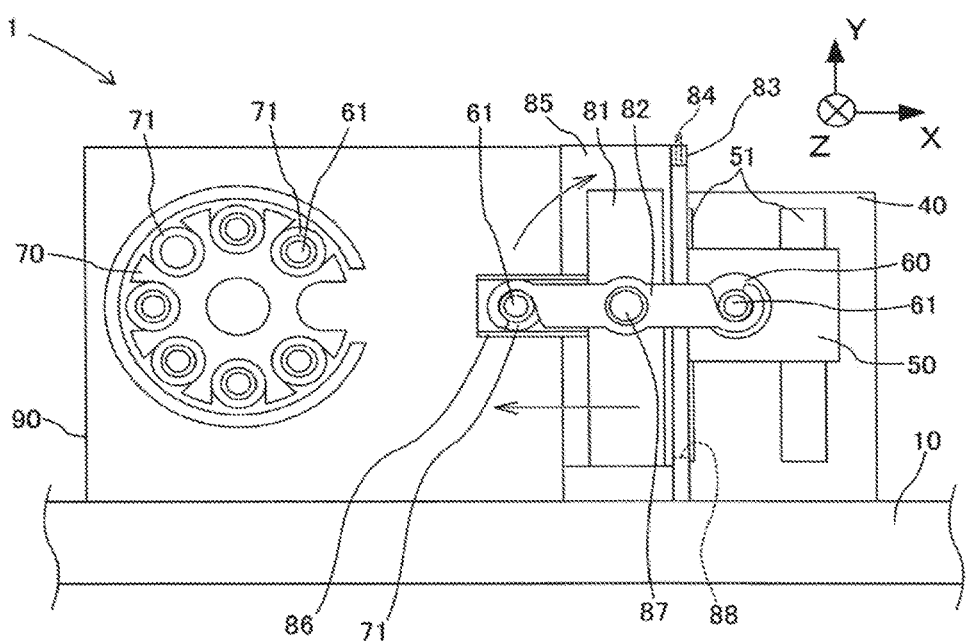
FIG. 3D is a front view of the machine tool, illustrating a state after the movement of the body toward the column and the rotation of the changing arm are finished.

As illustrated in FIG. 3D, the body 81 is stopped when the body 81 moves to a position where the distance from the central axis of the cutting tool 61 attached to the rotary main spindle 60 to the central axis of the rotation of the changing arm 82 is equal to the distance from the central axis of the cutting tool 61 held by the tool holder 86 to the central axis of the rotation of the changing arm 82. Then, the changing arm 82 grips both of the cutting tool 61 attached to the rotary main spindle 60 and the cutting tool 61 held by the tool holder 86, and respectively detaches the cutting tools 61 and 61 from the rotary main spindle 60 and the tool holder 86.

Then, the changing arm 82 further rotates in the counterclockwise direction in FIG. 3D to move the cutting tool 61 detached from the tool holder 86 to the position of the rotary main spindle 60 and the cutting tool 61 detached from the rotary main spindle 60 to the position of the tool holder 86. Then, the changing arm 82 respectively attaches the cutting tools 61 and 61 to the rotary main spindle 60 and the tool holder 86. In this manner, the changing arm 82 performs the operation of changing the cutting tools 61 and 61.

As illustrated in FIG. 4, when the operation of changing the cutting tool 61 by the changing arm 82 is finished, the controller 100 starts rotation of the changing arm 82 in a clockwise direction illustrated in FIG. 3D. Thus, the two cutting tools 61 in the gripped state are released from the changing arm 82. In addition, the controller 100 starts movement of the body 81 toward the tool magazine 70 and an operation of closing the door 84 in parallel with the operation of rotating the changing arm 82. When the tool changer 80 moves to a position where the tool changer 80 does not interfere with the column 40 as viewed in the Z axis direction, the controller 100 starts an operation of advancing the column 40 toward the table 20. The changing arm 82 is stopped when the changing arm 82 rotates to assume a state in which its longitudinal direction coincides with the Y axis direction. The opening 88 is closed by the door 84.

As described above, the controller 100 moves the body 81 toward the column 40 in parallel with the operation of opening the door 84. Similarly, the controller 100 moves the body 81 toward the tool magazine 70 in parallel with the operation of closing the door 84. Thus, in the machine tool 1, the period of time required to change the cutting tool 61 can be shortened as compared to a case where the operation of opening the door 84 is started after the movement of the body 81 is finished and a case where the movement of the body 81 is started after the operation of closing the door 84 is finished.

The controller 100 starts the rotation of the changing arm 82 before the operation of opening the door 84 and the movement of the body 81 toward the column 40 are completed. Similarly, the controller 100 starts the operation of closing the door 84 and the movement of the body 81 toward the tool magazine 70 before the rotation of the changing arm 82 is completed. That is, the controller 100 performs the operation of opening or closing the door 84 and the movement of the body 81 in parallel with the operation of rotating the changing arm 82. Thus, in the machine tool 1, the period of time required to change the cutting tool 61 can be shortened as compared to a case where the rotation of the changing arm 82 is started after the operation of opening the door 84 and the movement of the body 81 toward the column 40 are completed and a case where the operation of closing the door 84 and the movement of the body 81 are started after the rotation of the changing arm 82 is completed.

The tool changer 80 changes the cutting tool 61 after the tool changer 80 moves to a position where the tool changer 80 overlaps the column 40 in the Z axis direction. In this case, the width dimension of the column 40 in the X axis direction can be increased. Thus, the rigidity of the column 40 can be increased. Further, the distance between the rotational axis of the changing arm 82 and the central axis of the cutting tool 61 attached to the rotary main spindle 60 can be reduced when the changing arm 82 performs the operation of changing the cutting tool 61. Therefore, the length dimension of the changing arm 82 in the longitudinal direction can be reduced. Thus, in the tool changer 80, the period of time required for the changing arm 82 to perform the operation of changing the cutting tool 61 can be shortened.

The cutting tool 61 to be used for changing the cutting tool 61 attached to the rotary main spindle 60 is held by the tool holder 86, and moves together with the changing arm 82. Therefore, the length dimension of the changing arm 82 in the longitudinal direction can be reduced. Thus, in the tool changer 80, the period of time required for the changing arm 82 to perform the operation of changing the cutting tool 61 can be shortened.

The present invention has been described above based on the embodiment, but is not limited to the embodiment described above. It can easily be understood that various modifications may be made without departing from the spirit of the present invention.

For example, the embodiment described above is directed to the case where the rotation of the changing arm 82 is started before the operation of opening the door 84 and the movement of the body 81 toward the column 40 are finished. Further, the embodiment described above is directed to the case where the operation of closing the door 84 and the movement of the body 81 toward the tool magazine 70 are started before the rotation of the changing arm 82 is finished. The present invention is not limited to those cases.

Figure 5A:
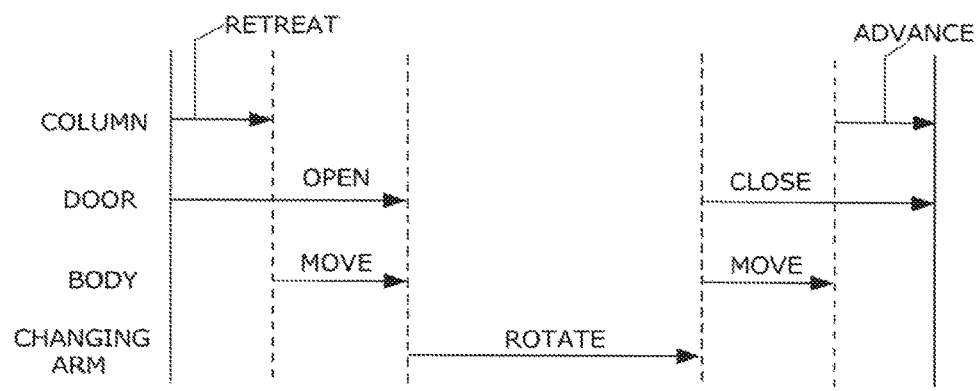
FIG. 5A is a time chart illustrating a modified example of the operation conditions of the column, the door, the body, and the changing arm.

For example, as illustrated in FIG. 5A, the controller 100 may start the rotation of the changing arm 82 after the operation of opening the door 84 and the movement of the body 81 toward the column 40 are finished. Similarly, the controller 100 may start the operation of closing the door 84 and the movement of the body 81 toward the tool magazine 70 after the rotation of the changing arm 82 is finished. Thus, in the machine tool 1, the control to be performed by the controller 100 for the tool changer 80 can be simplified.

Figure 5B:
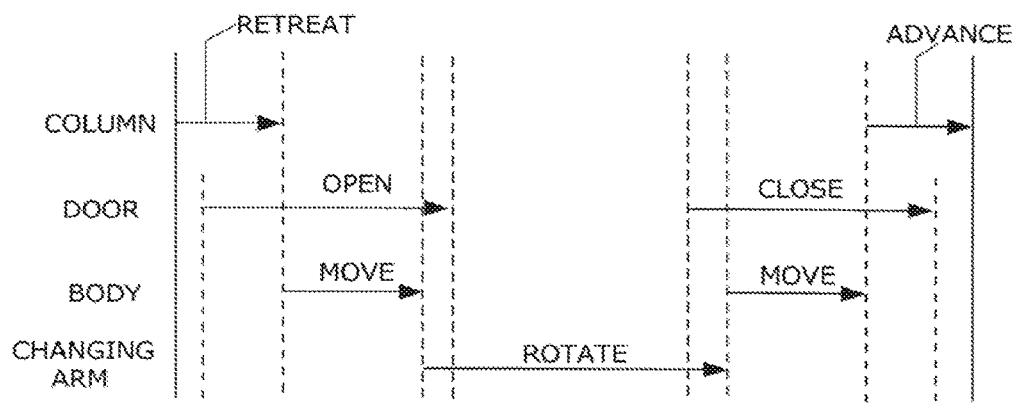
FIG. 5B is a time chart illustrating a modified example of the operation conditions of the column, the door, the body, and the changing arm.

As illustrated in FIG. 5B, the controller 100 may start the rotation of the changing arm 82 before the operation of opening the door 84 is finished and after the movement toward the column 40 is finished. Similarly, the controller 100 may start the operation of closing the door 84 before the rotation of the changing arm 82 is finished while starting the movement of the body 81 toward the tool magazine 70 after the rotation of the changing arm 82 is finished. Thus, in the machine tool 1, the period of time required to change the cutting tool 61 can be shortened while simplifying the control for the tool changer 80.

As described above, the machine tool 1 includes the bed 10, the column 40, the rotary main spindle 60, the tool magazine 70, the tool changer 80, and the controller 100. The column 40 is provided so as to be reciprocally movable on the bed 10. The rotary main spindle 60 is rotatably provided on the column 40. The tool magazine 70 is configured to house the cutting tools 61 serving as tools. The tool changer 80 is configured to change the tool attached to the rotary main spindle 60 for the tool housed in the tool magazine 70. The controller 100 is configured to control the column 40, the rotary main spindle 60, and the tool changer 80.

The tool changer 80 includes the body 81, the changing arm 82, and the door 84. The body 81 is provided on the bed 10 so as to be movable in the direction orthogonal to the movement direction of the column 40. The changing arm 82 is rotatably provided on the body 81. The door 84 is provided on the body 81 to open or close the opening 88 formed in the body 81, and is configured to partition the area on the column 40 side from the area on the tool magazine 70 side by closing the opening 88. The controller 100 is configured to move the body 81 in parallel with at least one of the operation of opening the door 84 and the operation of closing the door 84.

According to the machine tool 1, the body 81 is moved in parallel with at least one of the operation of opening the door 84 and the operation of closing the door 84. Thus, the period of time required to change the cutting tool 61 serving as the tool can be shortened.

In the machine tool 1 described above, the controller 100 is configured to move the body 81 toward the column 40 in parallel with the operation of opening the door 84. In the machine tool 1, the period of time required to change the cutting tool 61 serving as the tool can be shortened.

In the machine tool 1 described above, the controller 100 is configured to move the body 81 toward the tool magazine 70 in parallel with the operation of closing the door 84. In the machine tool 1, the period of time required to change the tool can be shortened.

In the machine tool 1 described above, the controller 100 is configured to start the operation of rotating the changing arm 82 before the operation of opening the door 84 is completed. In the machine tool 1, the period of time required to change the tool can be shortened.

In the machine tool 1 described above, the controller 100 is configured to start the operation of closing the door 84 before the operation of rotating the changing arm 82 is completed. In the machine tool 1, the period of time required to change the tool can be shortened.

In the machine tool 1 described above, the controller 100 is configured to move the body 81 toward the column 40 in parallel with the operation of rotating the changing arm 82. In the machine tool 1, the period of time required to change the tool can be shortened.

In the machine tool 1 described above, the controller 100 is configured to move the body 81 toward the tool magazine 70 in parallel with the operation of rotating the changing arm 82. In the machine tool 1, the period of time required to change the tool can be shortened.

In the machine tool 1 described above, when the changing arm 82 performs the operation of changing the tool, the door 84 is arranged at a position where the door 84 overlaps the column 40 as viewed in the movement direction of the column 40. In the machine tool 1, the size of the column 40 can be increased. Thus, the rigidity of the column 40 can be secured. According to the machine tool 1, the length dimension of the changing arm 82 in the longitudinal direction can be reduced. Thus, in the tool changer 80, the period of time required for the changing arm 82 to perform the operation of changing the cutting tool 61 can be shortened.

In the machine tool 1 described above, the tool changer 80 includes the tool holder 86 fixed to the body 81, and configured to hold one of the tools that is taken out of the tool magazine 70. The changing arm 82 is configured to change the tool attached to the rotary main spindle 60 for the tool held by the tool holder 86. According to the machine tool 1, the length dimension of the changing arm 82 can be reduced. Thus, in the tool changer 80, the period of time required for the changing arm 82 to perform the operation of changing the cutting tool 61 can be shortened.

In the machine tool 1 described above, the controller 100 is configured to move the body 81 in parallel with the movement of the column 40. In the machine tool 1, the period of time required to change the tool can be shortened.

What is claimed is:

1. A machine tool, comprising:
    a bed;
    a column provided so as to be reciprocally movable on the bed;
    a rotary main spindle rotatably provided on the column;
    a tool magazine configured to house tools;
    a tool changer configured to change a tool attached to the rotary main spindle for one of the tools housed in the tool magazine; and
    a controller configured to control the column, the rotary main spindle, and the tool changer, wherein
    the tool changer includes:
        a body provided on the bed so as to be movable in a direction orthogonal to a movement direction of the column;
        a changing arm rotatably provided on the body; and
        a door provided on the body to open or close an opening formed in the body, and configured to partition an area on a side of the machine tool at which the column is located from an area on a side of the machine tool at which the tool magazine is located by closing the opening, and
    the controller is configured to move the body concurrently with at least one of an operation of opening the door and an operation of closing the door.

2. The machine tool according to claim 1, wherein the controller is configured to move the body toward the column concurrently with the operation of opening the door.

3. The machine tool according to claim 2, wherein the controller is configured to start an operation of rotating the changing arm before the operation of opening the door is completed.

4. The machine tool according to claim 3, wherein the controller is configured to move the body toward the column concurrently with the operation of rotating the changing arm.

5. The machine tool according to claim 1, wherein the controller is configured to move the body toward the tool magazine concurrently with the operation of closing the door.

6. The machine tool according to claim 5, wherein the controller is configured to start the operation of closing the door before an operation of rotating the changing arm is completed.

7. The machine tool according to claim 6, wherein the controller is configured to move the body toward the tool magazine concurrently with the operation of rotating the changing arm.

8. The machine tool according to claim 1, wherein, when the changing arm performs an operation of changing the tool attached to the spindle for one of the tools housed in the tool magazine, the door is arranged at a position where the door overlaps the column as viewed in the movement direction of the column.

9. The machine tool according to claim 1, wherein
   the tool changer includes a tool holder fixed to the body, and configured to hold one of the tools that is taken out of the tool magazine, and
   the changing arm is configured to change the tool attached to the rotary main spindle for the tool held by the tool holder.

10. The machine tool according to claim 1, wherein the controller is configured to move the body concurrently with movement of the column.

\* \* \* \* \*